May 7, 1957    R. NAGY ET AL    2,791,723
ELECTROLUMINESCENT CELL
Filed Oct. 1, 1953
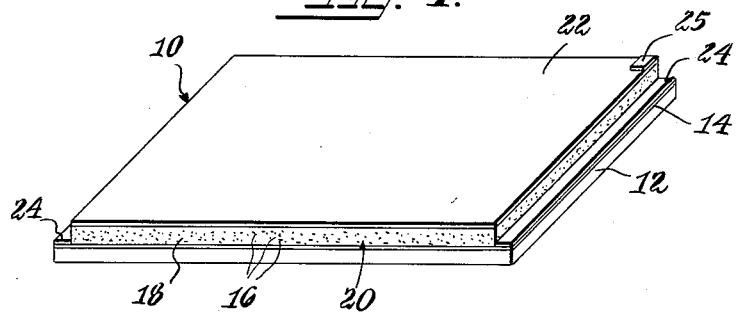
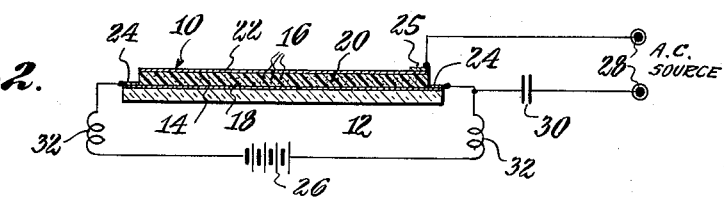
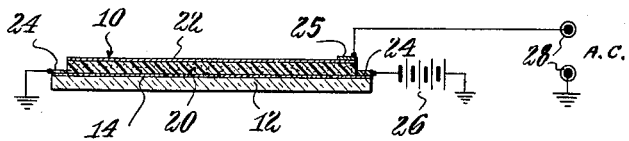
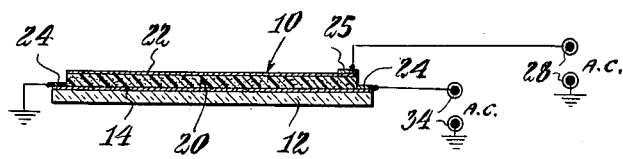
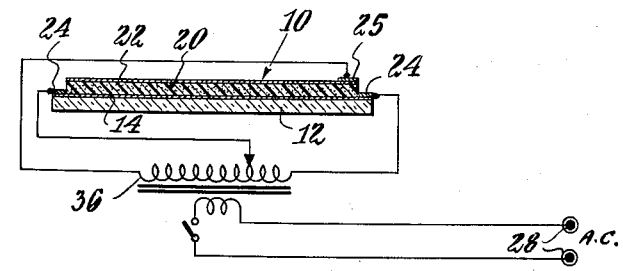
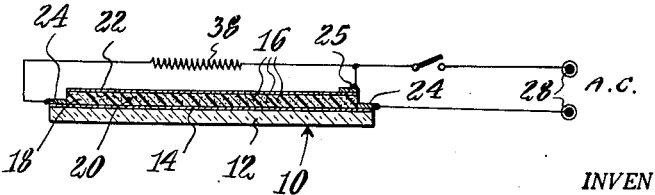
INVENTORS
R. NAGY and
R. W. WOLLENTIN.
BY
ATTORNEY.

United States Patent Office 2,791,723
Patented May 7, 1957

2,791,723

ELECTROLUMINESCENT CELL

Rudolph Nagy, Upper Montclair, and Robert W. Wollentin, Bloomfield, N. J., assignors to Westinghouse Electric Corporation, East Pittsburgh, Pa., a corporation of Pennsylvania Application October 1, 1953, Serial No. 383,450

4 Claims. (Cl. 315—115)

This invention relates to electroluminescent cells and, more particularly, to an electroluminescent cell wherein one of the cell electrodes functions as a heater element.

G. Destriau in "New phenomenon of electrophotoluminescence," Philosophical Magazine, October 1947, vol. 38, pages 700–737, discloses at pages 726–730 that the brightness of an electroluminescent cell is increased with increasing absolute temperature of the cell. Destriau attributes this phenomenon to the fact that the threshold of visible luminescence for an electroluminescent cell is lower at higher temperatures.

One of the objections to the presently existing electroluminescent cells is the relatively low brightness which has severely limited their application. These cells normally operate at or only slightly greater than room temperatures due to the fact that their power consumption is sufficiently low as to result in only a very small amount of heating due to $I^2R$ losses. It is thus the general object of our invention to avoid and overcome this objection by the provision of an electroluminescent cell which operates with increased brightness.

A further object of our invention is to provide an electroluminescent cell which radiates with increased brightness and which may be fabricated approximately as easily and as cheaply as the presently existing cells.

The aforesaid objects of the invention, and other objects which will become apparent as the description proceeds, are achieved by utilizing one of the cell electrodes as a heater element in order to raise the operating temperature of the cell and thus increase its brightness.

For a better understanding of the invention, reference should be had to the accompanying drawings, in which:

Fig. 1 is a perspective view of an electroluminescent cell;

Fig. 2 is a sectional-elevational view of a cell as illustrated in Fig. 1, showing an excitation circuit for the cell;

Fig. 3 is a sectional-elevational view corresponding to Fig. 2, illustrating a modification of the energizing circuit for the cell;

Fig. 4 is a sectional-elevational view of a cell corresponding to Fig. 2, showing an additional modification of the energizing circuit for the cell;

Fig. 5 illustrates a still further modification of the energizing circuit; and

Fig. 6 represents still another modification of the cell energizing circuit.

With specific reference to the form of the invention illustrated in the drawings, the numeral 10 indicates generally an electroluminescent cell which is substantially similar to the cell described in copending application of Chung Kwai Lui Wei, Serial No. 258,627, filed November 28, 1951 and assigned to the present assignee.

The cell generally consists of a glass backing plate 12 which has an electrode on one side thereof of transparent adhering conductive coating 14. A phosphor 16 is embedded in a dielectric 18 to form a phosphor-dielectric layer 20, which layer is placed over and adheres to the conductive coating 14. A second electrode 22 is placed over and adheres to the phosphor-dielectric layer 20 and separate electrode contacts or bus bars 24 are attached to opposite sides of electrode 14. An additional electrical contact adaptor 25 is attached to one side of electrode 22. In forming the bus bar 24, a silver powder, suspended in a binder of nitrocellulose or the like, is painted on the electrode area to which the bus bar is to be attached. This "paint" is then baked at 500 to 600° C. to bake out the binder. The baked silver is then copper plated by conventional plating means to form the bus bars and the necessary lead wires may be readily soldered to these bus bars. The electrical contactor 25 may be fabricated in a similar way. Other well known methods of fabricating the bus bars 24 and 25 may be employed, for example, as outlined in Patent No. 2,624,823 to W. O. Lytle. It should be noted that the bus bars 24 should extend substantially along the entire length of oppositely disposed sides of electrode-heater element 14, and also should be substantially parallel to effect even heating of the cell. In addition, they may project somewhat beyond the phosphor-dielectric layer 20, as shown, although contact tabs could be provided, if desired, and the electrode 14 and phosphor-dielectric layer 20 made coextensive.

The glass plate 12 is usually transparent in order to transmit light generated by the cell and may be fabricated of any transparent glass which softens at temperatures above 400° C. Thus any plate or window glass will be satisfactory for use for a glass backing plate 12.

The transparent electrically conductive coating 14 also serves in this instance as a heater element and may consist of a very thin coating of tin oxide whose thickness may be about 0.00005080 cm. Such a coating may be applied by conventional coating techniques as are well known and Patent No. 2,522,531 of John M. Mochel describes one method of coating which may be used to produce the desired coating of tin oxide. Other conductive coatings such as noted in the heretofore mentioned Mochel patent may be substituted for the tin oxide coating.

The resistivity for such a tin oxide coating at the indicated thickness is about 60 ohms per square, that is, a 6 x 6 square will have the same electrical resistance between any two opposite edges as a 3 x 3 square, the reason for this being that surface resistance only is considered and as the size square under consideration is increased, the path distance between the bus bars along two opposite edges increases in the same ratio as their length, thereby keeping the resistance between them constant. It should be noted that alternating and direct current function equally well in heating the very thin electrically conductive coating.

It may be desired in some applications to use a rectangular shape for the tin oxide coating 14 and in this case the resistance of the rectangular area can be calculated as follows:

Total Resistance =
$$\frac{\text{Resistance Per Square Area} \times \text{Distance Between Electrode Contacts}}{\text{Length of Electrode Contacts}}$$

The bus bars 24 may be located along opposite sides of the conductive coating-heater element 14 and should preferably run the entire length of the side in order to effect even heating of the electrode-heater element during operation of the cell. Electrical contact adaptor 25 need only occupy a relative small area on electrode 22 in order to permit proper operation of the cell.

The power consumption "P" of the coating 14, which represents the heat generated, may be readily calculated by the standard formula:

$$P = \frac{E^2}{R}$$

The phosphor 16 which is embedded in the dielectric 18 to form the phosphor dielectric layer 20 may be a mixture of zinc oxide and zinc sulphide, activated by copper, as indicated on page 710 of the afore-mentioned Destriau publication. As an example, the 75% zinc oxide, 25% zinc sulphide copper activated phosphor may be used if desired.

The dielectric 18 may be fabricated of a plastic which is capable of withstanding temperatures from 20° C. to 400° C. without deforming, depolymerizing or oxidizing, and examples of suitable dielectrics which may be used are calcium aluminum silicate or glass bonded mica. The glass bonded mica consists of pulverized mica bonded with silica, mixed with a phosphor and pressed into a sheet to form the phosphor-dielectric layer 20. This layer may vary in thickness, but a representative thickness is 2 one thousandths of an inch. Phenyl methyl silicones having an organic group to silicon ratio of about 1.5 to 1 may also be used as the dielectric. Such compounds are available as varnishes and are sold by several commercial suppliers under the general descriptive term "Silicones."

The electrode 22 may be fabricated of aluminum or any suitable conductor, if desired, which may be pressed on to the dielectric phosphor layer during fabrication of the cell, a representative thickness of such an electrode being .01 cm. It is important that all air pockets or voids between the two electrodes be eliminated and this may be sufficiently achieved for most purposes by pressing the two electrodes together during fabrication of the cell. The electrode 22 may also be applied over the phosphor-dielectric layer 20 by vacuum metallizing techniques, as are well-known in the art. In such a case the thickness of electrode 22, if desired, could be of an order of thickness only slightly greater than the tin-oxide electrode 14 (e. g., .001 cm. or less).

While we have disclosed using one of the electrodes as a heater element, it should be pointed out that it would also be possible to incorporate a separate heater element in the cell, but this would necessitate a relatively complicated fabrication procedure. In addition, if the separate heater element were not in direct contact with the phosphor-dielectric layer, the efficiency in heating the phosphor-dielectric layer would be impaired. Also, if a separate heater element were included between the electrode 22 and phosphor dielectric layer 20, a considerable portion of the heat generated would be radiated from the electrode 22 and thus not be utilized to heat the cell. A separate heater could also be included on the outside surface of the glass backing plate 12, but in such a structure much of the heat generated would be wasted in heating the glass plate 12 and, of course, considerable heat would be lost through convection and radiation to the atmosphere. If a conventional mesh type separate heater element were included between the tin oxide layer constituting electrode 14 and backing plate 12, difficulties would be encountered in maintaining a constant thickness in electrode 14, and in screening the cell output if the heater element were opaque. If a conventional mesh type separate heater element were included between the tin oxide electrode 14 and the phosphor dielectric layer 20, the electrodes 12 and 22 would necessarily be further apart because of the thickness of the heater element, thus decreasing the field between the electrodes and decreasing the brilliancy of the cell, also the thickness of the phosphor-dielectric layer would vary according to the thickness of the heater element mesh or wires.

It is for the foregoing reasons that we may achieve the greatly increased brilliancy of the cell by using the electrode 14 between the backing plate 12 and the phosphor-dielectric layer 20 as a heater element as well as an electrode, and resort to other methods of heating will not result in the same increase in brilliancy.

There is shown in Fig. 2 one circuit which may be used to supply heater and excitation power to the cell. The cell itself is as illustrated in Fig. 1, and connected across the electrical contacts or bus bars 24 of electrode 14 is a source of D. C. potential 26 which serves to supply the power for heating the electrode-heater element 14. This D. C. potential may be supplied by a battery, or rectified A. C., etc. Connected across the two cell electrodes 14 and 22 is a source of alternating current 28 which creates an alternating field between the cell electrodes and excites the field response phosphor 16 embedded in dielectric 18 to electroluminescence.

The potential of the alternating current source may be the usual line voltage of 110, if desired. The potential of the D. C. source may vary somewhat depending upon the amount of heating which is desired, and a method of determining the amount of heating obtained with any specific heater voltage will be hereinafter explained.

It is of course desirable to isolate the alternating current source from the D. C. potential and a blocking condenser 30 may be provided in the line connecting the electrode-heater element 14 and the A. C. source. This condenser, if desired, may have a capacity of about 10 times the capacity of the cell which in the case of a 6" x 6" cell, as specified, would be about 0.1 microfarad. With higher frequencies of excitation, for example, 500 cycles and over, it might be desirable to add inductive reactances 32 in the D. C. lines to isolate the D. C. source from the A. C. excitation source. As an example, at 1000 cycle excitation frequency, a one henry inductive reactance could be placed in each of the D. C. lines.

In Fig. 3 is illustrated another excitation circuit in which one side of the A. C. excitation source and one side of the D. C. heating source are grounded. The high potential side of the A. C. source is then connected to the electrical contact adaptor 25 of electrode 22 and the high potential side of the D. C. source is connected to one bus bar 24 of electrode heater element 14. The other bus bar of the electrode-heater element is grounded.

The electrode-heater element 14 might also be heated by alternating current and such an energizing circuit is shown in Fig. 4 which corresponds to the circuit shown in Fig. 3 except that an A. C. heating source 34 has been substituted for the D. C. heating source 26 as represented in Fig. 3.

In Fig. 5 there is illustrated a circuit which is comparable to Fig. 4 except that the two separate A. C. sources are replaced by a transformer 36 the primary of which may be connected across the usual 110 volt 60 cycle lighting source and the secondary of which may be so wound as to provide much higher excitation voltages for the cell, for example, 600 volts. The secondary of transformer 36 is tapped and the tap and one side of the secondary are connected to the heater element bus bars 24 to provide a potential for heating the element 14. The voltages which are needed for heating in any application may be readily determined by methods as hereinafter outlined.

The tapped transformer, as illustrated in Fig. 5 may be eliminated, if desired, and a lower heating voltage obtained without the use of a transformer by adding a dropping resistor 38 in the line which connects the A. C. source to one side of the heater element 14. This is illustrated in Fig. 6. Of course, in all embodiments, as illustrated and described, a switching arrangement to operate the cell may be included in the power supply lines to operate the cell. Such switching arrangements are well-known.

In the operation of our cells we have realized results comparable to those obtained by Destriau as disclosed at page 729 of his afore-mentioned article. In practice we find it necessary to limit the maximum temperature of the phosphor-dielectric layer 20 to about 400° C. or the life of the cell will be shortened appreciably. It should be noted, however, that above 150° C. the results become rather erratic and unpredictable and the curve of Log Brilliance v. The Reciprocal of the Absolute Temperature, as illustrated by Destriau on page 729 of his aforementioned article, becomes somewhat erratic.

Our test results indicate approximately 125 watts/ft.$^2$ are necessary to obtain a temperature of 100° C. Thus to heat a 6″ x 6″ cell to a temperature of 100° C. requires a power consumption of about 31 watts. In order to heat the electrode-heater element 14 to a temperature of 100° C., assuming the element to be 6″ x 6″, the heater current to be D. C. and the cell resistance to be 60 ohms per square, the heater voltage will necessarily be approximately 43 volts. Knowing the cell resistance, dimensions, and desired temperature the heater voltage may be readily calculated for any given cell.

In the cell as illustrated in the drawings, the various elements comprising the cell have not been drawn to scale, in order to better represent the construction. For example, the electrode-heater element 14 would normally be much thinner than as illustrated.

It will be recognized that the objects of the invention have been achieved by providing an electroluminescent cell wherein the brilliancy is greatly increased over the presently existing cells. In addition, the cell may be readily fabricated in the same manner as the presently existing cells.

As a possible alternative embodiment the electrode 24 may be made transparent, if desired, by fabricating it of materials similar to those used in fabricating the electrode-heater element 14, as described. Also, the electrode-heater element 14 may be made opaque, if desired, or the backing plate 12 may be made of an opaque material.

While in accordance with the patent statutes one best known embodiment of the invention has been illustrated and described in detail, it is to be particularly understood that the invention is not limited thereto or thereby.

We claim:

1. An electroluminescent cell comprising a backing plate having a first electrically-conductive layer thereover, a layer thereover of field-responsive phosphor embedded in a light-transmitting dielectric and a second electrically-conductive layer over said phosphor-dielectric layer, said phosphor characterized by having an electroluminescent brightness which increases as it is heated, said first electrically conductive layer having substantially parallel individual bus-bars disposed along opposite sides thereof, said second electrically-conductive layer having an electrical contact adapter attached thereto, a heater potential connected across said first electrically-conductive layer bus-bars for causing I$^2$R loss within said first layer, said heater potential adapted to be connected and disconnected, an electroluminescence energizing alternating-current potential connected across one of the bus bars of said first electrically-conductive layer and across the electrical contact adapter of said second electrically-conductive layer for exciting said phosphor to electroluminescence, said electroluminescence-energizing potential adapted to be connected and disconnected, and said electroluminescent cell being adapted to have simultaneously applied thereto said heating potential and said electroluminescence-energizing potential.

2. An electroluminescent cell comprising a light-transmitting backing plate having a light-transmitting electrically-conductive layer thereover, a layer thereover of field-responsive phosphor embedded in a light-transmitting dielectric and another electrically-conductive layer over said phosphor-dielectric layer, said phosphor characterized by having an electroluminescent brightness which increases as it is heated, said light-transmitting electrically conductive layer having substantially parallel individual bus bars disposed along opposite sides thereof, said other electrically-conductive layer having an electrical contact adapter attached thereto, a heater potential connected across said light-transmitting elecrically-conductive layer bus-bars for causing I$^2$R loss within said layer, said heater potential adapted to be connected and disconnected, an electroluminescence energizing alternating-current potential connected across one of the bus bars of said light-transmitting electrically-conductive layer and across the electrical contact adapter of said other electrically-conductive layer for exciting said phosphor to electroluminescence, said electroluminescence-energizing potential adapted to be connected and disconnected, and said electroluminescent cell being adapted to have simultaneously applied thereto said heating potential and said electroluminescence-energizing potential.

3. An electroluminescent cell comprising a light-transmitting backing plate having a first light-transmitting electrically-conductive layer thereover, a layer thereover of field-responsive phosphor embedded in a light-transmitting dielectric and a second light-transmitting electrically-conductive layer over said phosphor dielectric layer, said phosphor characterized by having an electroluminescent brightness which increases as it is heated, said first electrically conductive layer having substantially parallel individual bus bars disposed along opposite sides thereof, said second electrically-conductive layer having an electrical contact adapter attached thereto, a heater potential connected across said first electrically-conductive layer bus bars for causing I$^2$R loss within said first layer, said heater potential adapted to be connected and disconnected, an electroluminescence energizing alternating-current potential connected across one of the bus bars of said first electrically-conductive layer and across the electrical contact adapter of said second electrically-conductive layer for exciting said phosphor to electroluminescence, said electroluminescence-energizing potential adapted to be connected and disconnected, and said electroluminescent cell being adapted to have simultaneously applied thereto said heating potential and said electroluminescence-energizing potential.

4. An electroluminescent cell comprising a backing plate having an opaque electrically-conductive layer thereover, a layer thereover of field-responsive phosphor embedded in a light-transmitting dielectric and a second light-transmitting electrically conductive layer thereover, said phosphor characterized by having an electroluminescent brightness which increases as it is heated, said opaque electrically conductive layer having substantially parallel individual bus bars disposed along opposite sides thereof, said light-transmitting electrically-conductive layer having an electrical contact adapter attached thereto, a heater potential connected across said opaque electrically-conductive layer bus bars for causing I$^2$R loss within said opaque layer, said heater potential adapted to be connected and disconnected, an electroluminescence energizing alternating-current potential connected across one of the bus bars of said opaque electrically-conductive layer and across the electrical contact adapter of said light-transmitting electrically-conductive layer for exciting said phosphor to electroluminescence, said electroluminescence-energizing potential adapted to be connected and disconnected, and said electroluminescent cell being adapted to have simultaneously applied thereto said heating potential and said electroluminescence-energizing potential.

References Cited in the file of this patent
UNITED STATES PATENTS

| | | |
|---|---|---|
| 2,566,349 | Mager | Sept. 4, 1951 |
| 2,624,857 | Mager | Jan. 6, 1953 |